2,745,836
Patented May 15, 1956

2,745,836

TERTIARY-AMINOALKYL-α,α-DIARYL-SUCCINIMIDES AND PROCESS FOR THE PREPARATION THEREOF

Chester M. Suter, Albany, N. Y., assignor to Sterling Drug Inc., New York, N. Y., a corporation of Delaware No Drawing. Application September 20, 1952,
Serial No. 310,740

14 Claims. (Cl. 260—294.7)

This invention relates to N-tertiary-aminoalkyl-α,α-diarylsuccinimides and to the preparation thereof. These new compounds are useful as pharmacological agents and in particular possess local anesthetic properties.

My new compounds have the general formula

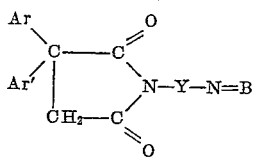

wherein Y is a lower-alkylene radical in which the free valences are on different carbon atoms, N=B is a member of the group consisting of di-lower-alkylamino, piperidino, pyrrolidino, morpholino and lower-alkylated derivatives thereof, and Ar and Ar' are monocyclic aryl radicals of the benzene series which together with the α-carbon atom of the succinimide ring may form a 9-fluorenyl group. These substances are prepared by reacting an alkali metal derivative of an α,α-diarylsuccinimide with an aminoalkyl halide, halogen—Y—N=B.

The divalent lower-alkylene radical, Y, can be straight or branched and includes from two to about six carbon atoms. Since the free valences of the group Y must be on different carbon atoms, Y must contain at least two carbon atoms, and at least two carbon atoms must separate the imide nitrogen atom and the tertiary-amine nitrogen atom. Examples of the lower-alkylene radical, Y, include ethylene (—CH$_2$CH$_2$—), propylene (—CH$_2$CH$_2$CH$_2$—)

methylethylene (—CH(CH$_3$)CH$_2$—), butylene (—CH$_2$CH$_2$CH$_2$CH$_2$—)

2,2-dimethyl-1,3-propylene (—CH$_2$C(CH$_3$)$_2$CH$_2$—), hexylene (—CH$_2$CH$_2$CH$_2$CH$_2$CH$_2$CH$_2$—), etc.

The tertiary-amino group, N=B, can be a di-lower-alkylamino group in which the lower-alkyl groups are the same or different and each possess from one to about six carbon atoms, including such groups as dimethylamino, diethylamino, ethylmethylamino, dipropylamino, dibutylamino, diamylamino and dihexylamino. The group N=B can also be an aliphatic type heterocyclic group such as piperidino, pyrrolidino, morpholino, 2-methylpyrrolidino, 2,5-dimethylpiperidino, etc.

The aryl groups, Ar and Ar', can be the same or different monocyclic radicals of the benzene series. If the Ar groups are joined directly by an o,o'-bond they form part of a fluorenyl group which is also within the purview of the invention. In other words, the (Ar)(Ar')C= portion of the molecule represents a diarylmethyl or 9-fluorenyl group. The phenyl rings of Ar and Ar' can be unsubstituted or substituted by groups inert to the action of the strongly basic condensing agents used in the process for preparing my new compounds. Such inert radicals include hydrocarbon groups, ether groups, the nitro group and halogen groups. However substituents having a hydrogen atom capable of being replaced by a strongly electropositive metal, such as hydroxyl, mercapto, primary or secondary amino, and substituents susceptible to condensation under the influence of strong basic condensing agents, such as cyano or acyloxy groups, are not suitable as substituents in Ar and Ar'. A preferred class of substituents for the groups Ar and Ar' are those selected from the class consisting of lower-alkyl, lower-alkoxy, nitro and halogen, where the lower-alkyl and lower-alkoxy radicals have from one to six carbon atoms. Each of the groups Ar and Ar' may have from one to three substituents. Furthermore, said substituents can be in any of the available positions of the phenyl nuclei of Ar and Ar', and where more than one, can be the same or different and can be in any of the various position combinations relative to each other. The halogen substituents include chloro, bromo, iodo and fluoro.

My new compounds are prepared by reacting an alkali metal derivative, e. g. the lithio-, sodio- or potassio-derivative, of an α,α-diarylsuccinimide with a tertiary-aminoalkyl halide having the formula halogen—Y—N=B. The reaction takes place readily at room temperature, but heating is desirable to insure completeness of the reaction. The alkali metal derivative of the succinimide is produced in situ by reaction of the free succinimide with a strong base derived from an alkali metal in an anhydrous medium. The strong base can be selected from such substances as alkali metal alkoxides, amides, and hydrides, e. g. sodium methoxide, sodium amide, sodium hydride, potassium amide, and the like.

The starting materials, the α,α-diarylsuccinimides, are produced by the following set of reactions:

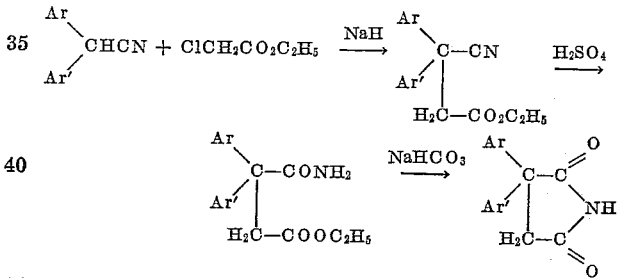

If the diarylacetonitrile used in these reactions is 9-cyanofluorene, the resulting α,α-diarylsuccinimide is a spiro compound, namely, spiro-[fluorene-9,α-succinimide].

The basic substituted succinimides of the invention are generally used in the form of their water-soluble, non-toxic acid-addition or quaternary ammonium salts, and these salts are within the purview of the invention. The acids which can be used to prepare the acid-addition salts are those which produce, when combined with the free bases, salts whose anions are relatively innocuous to an animal organism in therapeutic doses of the salts so that the beneficial physiological properties inherent in the free bases are not vitiated by any side effects ascribable to the anions. Appropriate acid-addition salts are those derived from mineral acids such as hydrochloric acid, hydrobromic acid, hydriodic acid and sulfuric acid, and organic acids such as acetic acid, citric acid and tartaric acid. The quaternary ammonium salts are produced by mixing the free base with a lower-alkyl or aralkyl ester of a strong inorganic acid or organic sulfonic acid, preferably in an inert organic solvent such as benzene or ether, with or without gentle heating. The quaternary ammonium salt either crystallizes immediately or can be obtained by concentration of the solvent. Exemplary alkyl or aralkyl esters of inorganic acids or organic sulfonic acids which can be used include methyl chloride, methyl bromide, methyl iodide, ethyl bromide, propyl chloride, benzyl chloride, benzyl bromide, methyl sulfate, methyl benzenesulfonate and methyl p-toluenesulfonate.

The following examples will further illustrate the invention but should not be construed as limitative.

Example 1

(a) *Ethyl 3-cyano-3,3-diphenylpropanoate.*—A mixture of 97 g. (0.5 mole) of diphenylacetonitrile and 15 g. (0.62 mole) of sodium hydride in 400 ml. of dry benzene was refluxed with stirring for three hours. The deep red mixture was cooled in an ice bath, and 122 g. (1 mole) of ethyl chloroacetate in 150 ml. of dry benzene was added to the mixture over a period of about ten minutes. The cooling bath was removed and the mixture stirred for an hour at room temperature and then refluxed for four hours. After cautious addition of water, the organic layer was separated and washed with water. After concentration of the benzene solution and subsequent dilution with petroleum ether (Skellysolve B), a brown-colored solid separated, which, after washing with petroleum ether, was recrystallized from ethanol and petroleum ether to give 105 g. (75%) of ethyl 3-cyano-3,3-diphenylpropanoate, M. P. 102–103° C. Recrystallization from methanol raised the melting point to 104–106° C.

(b) *α,α-Diphenylsuccinimide.*—A solution of 105 g. (0.38 mole) of ethyl 3-cyano-3,3-diphenylpropanoate in 350 g. of concentrated sulfuric acid was allowed to stand for five days in an open flask. The solution was then poured with vigorous stirring onto 1 kg. of ice and 800 ml. of water, whereupon a gummy solid separated. The mixture was then treated with 600 g. of sodium bicarbonate and heated on the steam bath until the solid lost its gummy consistency. About 400 g. of sodium bicarbonate was then added to make the mixture alkaline. The suspension so formed was heated on the steam bath for several hours and the solid material was collected by filtration, washed with water and recrystallized from ethanol with decolorization to give 58 g. (60%) of α,α-diphenylsuccinimide, M. P. 138–139° C.

(c) *N - (2 - dimethylaminoethyl) - α,α - diphenylsuccinimide.*—The sodio derivative of α,α-diphenylsuccinimide was prepared by heating at reflux for two hours 12.5 g. (0.05 mole) of α,α-diphenylsuccinimide in a solution of sodium ethoxide prepared from 1.15 g. (0.05 g. atom) of sodium and 75 ml. of absolute ethanol. The reaction mixture was cooled with an ice bath and 10.9 g. (0.1 mole) of dimethylaminoethyl chloride in 50 ml. of dry benzene was then added. The reaction mixture was refluxed for two hours, the sodium chloride which had separated was removed by filtration, and the organic solution was concentrated at reduced pressure. The residue was taken up in benzene, washed with water and again concentrated and dried azeotropically with benzene at reduced pressure. This residue, consisting of N-(2-dimethylaminoethyl)-α,α-diphenylsuccinimide in the free base form, was dissolved in dry ether, and alcoholic hydrogen chloride was added. The solid which separated was collected by filtration and recrystallized from a mixture of methyl alcohol and isopropyl alcohol to give 11.5 g. of the hydrochloride of N-(2-dimethylaminoethyl)-α,α-diphenylsuccinimide, M. P. 242–244° C.

*Anal.*—Calcd. for $C_{20}H_{23}N_2O_2Cl$: C, 66.93; H, 6.46; Cl, 9.88. Found: C, 67.23; H, 6.26; Cl, 9.81.

A solution of 12.5 g. of N-(2-dimethylaminoethyl)-α,α-diphenylsuccinimide, as the free base, and 15 ml. of methyl iodide in 100 ml. of dry ether was refluxed for fifteen minutes. The solid which separated was collected by filtration to give 13.8 g. of the methiodide of N-(2-dimethylaminoethyl)-α,α-diphenylsuccinimide, M. P. 207–210° C. Recrystallization from an isopropyl alcohol-methyl alcohol mixture gave a sample melting at 218–219° C.

*Anal.*—Calcd. for $C_{21}H_{25}N_2O_2I$: C, 54.31; H, 5.43; I, 27.33. Found: C, 54.63; H, 5.29; I, 27.00.

Example 2

N - (3 - dimethylaminopropyl) - α,α - diphenylsuccinimide was prepared according to the method described in Example 1, part (c), from α,α-diphenylsuccinimide and 3-dimethylaminopropyl chloride. The hydrochloride melted at 175–176° C. when recrystallized from ethyl acetate.

*Anal.*—Calcd. for $C_{21}H_{25}N_2O_2Cl$: C, 67.64; H, 6.76; Cl, 9.51. Found: C, 67.81; H, 6.64; Cl, 9.47.

The methiodide had the M. P. 243–245° C. when recrystallized from a mixture of methyl alcohol and isopropyl alcohol.

*Anal.*—Calcd. for $C_{22}H_{27}N_2O_2I$: C, 55.30; H, 5.69; I, 26.53. Found: C, 55.55; H, 5.81; I, 26.50.

Example 3

N - (2 - dibutylaminoethyl) - α,α - diphenylsuccinimide was prepared according to the method described in Example 1, part (c), from α,α-diphenylsuccinimide and 2-dibutylaminoethyl chloride. The hydrochloride had the M. P. 152.5–154° C. when recrystallized from ethyl acetate and then from isopropyl alcohol.

*Anal.*—Calcd. for $C_{26}H_{35}N_2O_2Cl$: C, 70.49; H, 7.96; Cl, 8.00. Found: C, 70.38; H, 8.23; Cl, 8.06.

The methiodide had the M. P. 187–189° C. when recrystallized from a mixture of ethyl acetate and methyl alcohol.

*Anal.*—Calcd. for $C_{27}H_{34}N_2O_2I$: C, 59.12; H, 6.80; I, 23.14. Found: C, 59.25; H, 6.60; I, 23.12.

Example 4

N-(2-piperidinoethyl)-α,α-diphenylsuccinimide was prepared according to the method described in Example 1, part (c), from α,α-diphenylsuccinimide and 2-piperidinoethyl chloride. The hydrochloride had the M. P. 177–180° C. when recrystallized from a mixture of ethyl acetate and methyl alcohol.

*Anal.*—Calcd. for $C_{23}H_{27}N_2O_2Cl$: C, 69.25; H, 6.82; Cl, 8.89. Found: C, 69.46; H, 6.99; Cl, 8.64.

The methiodide had the M. P. 192–195° C. when recrystallized from a mixture of ethyl acetate and methyl alcohol.

*Anal.*—Calcd. for $C_{24}H_{29}N_2O_2I$: C, 57.14; H, 5.80; I, 25.16. Found: C, 56.85; H, 5.83; I, 24.98.

Example 5

N-(2-diethylaminoethyl)-α,α-diphenylsuccinimide was prepared according to the method described in Example 1, part (c), from α,α-diphenylsuccinimide and 2-diethylaminoethyl chloride. The hydrochloride had the M. P. 162–162.5° C.

*Anal.*—Calcd. for $C_{22}H_{27}N_2O_2Cl$: C, 68.29; H, 7.03; Cl, 9.16. Found: C, 68.22; H, 6.93; Cl, 9.34.

Example 6

N - (2 - diisopropylaminoethyl) - α,α - diphenylsuccinimide was prepared according to the method described in Example 1, part (c), from α,α-diphenylsuccinimide and 2-diisopropylaminoethyl chloride. The hydrochloride had the M. P. 226–228° C. when recrystallized from a mixture of ethyl acetate and methyl alcohol.

*Anal.*—Calcd. for $C_{24}H_{31}N_2O_2Cl$: C, 69.46; H, 7.53; Cl, 8.55. Found: C, 69.73; H, 7.42; Cl, 8.52.

Example 7

N-(2-morpholinoethyl)-α,α-diphenylsuccinimide was prepared according to the method described in Example 1, part (c), from α,α-diphenylsuccinimide and 2-morpholinoethyl chloride. The hydrochloride had the M. P. 205–207.5° C. when recrystallized from a mixture of ethyl acetate and methyl alcohol.

*Anal.*—Calcd. for $C_{22}H_{24}N_2O_3Cl$: C, 65.91; H, 6.28; Cl, 8.84. Found: C, 65.64; H, 6.07; Cl, 8.90.

Example 8

N-(3-morpholinopropyl)-α,α-diphenylsuccinimide was prepared according to the method described in Example 1, part (c), from α,α-diphenylsuccinimide and 3-morpholinopropyl chloride. The hydrochloride had the M. P. 226–227° C. when recrystallized from a mixture of ethyl acetate and methyl alcohol.

*Anal.*—Calcd. for $C_{23}H_{27}N_2O_3Cl$: C, 66.57; H, 6.56; Cl, 8.54. Found: C, 66.28; H, 6.65; Cl, 8.45.

Example 9

N-(2-pyrrolidinoethyl)-α,α-di-(p-tolyl)succinimide having the formula

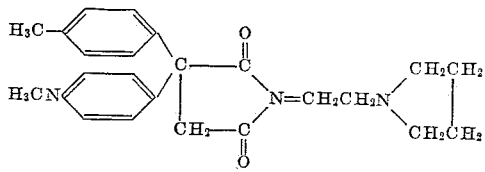

can be prepared according to the method described in Example 1, part (c), from α,α-di-(p-tolyl)succinimide and 2-pyrrolidinoethyl chloride.

Example 10

N - [2 - (2 - methylpiperidino)ethyl] - α,α - di - (p-chlorophenyl)succinimide having the formula

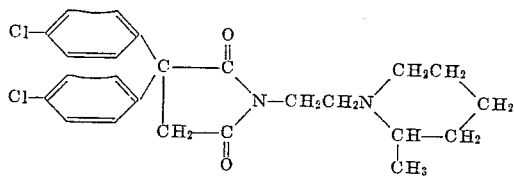

can be prepared according to the method described in Example 1, part (c), from α,α-di-(p-chlorophenyl)succinimide and 2-(2-methylpiperidino)ethyl chloride.

Example 11

N - (3 - dimethylamino - 2,2 - dimethylpropyl) - α - (p-anisyl)-α-phenylsuccinimide having the formula

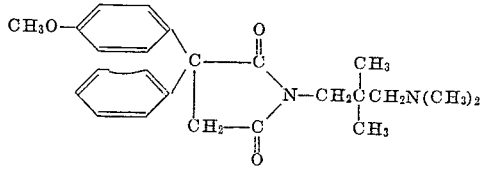

can be prepared according to the method described in Example 1, part (c), from α-(p-anisyl)-α-phenylsuccinimide and 3-dimethylamino-2,2-dimethylpropyl chloride.

Example 12

N - (6 - diethylaminohexyl) - spiro - [fluorene - 9,α-succinimide] having the formula

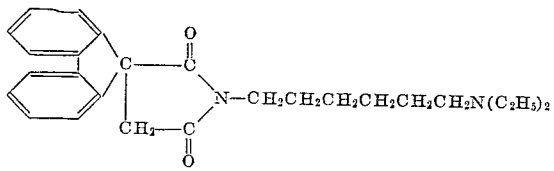

can be prepared according to the method described in Example 1, part (c), from spiro-[fluorene-9,α-succinimide] and 6-diethylaminohexyl chloride.

Example 13

N - [2 - (3,5 - dimethylmorpholino)ethyl] - α,α - di - (3,4-methylenedioxyphenyl)-succinimide having the formula

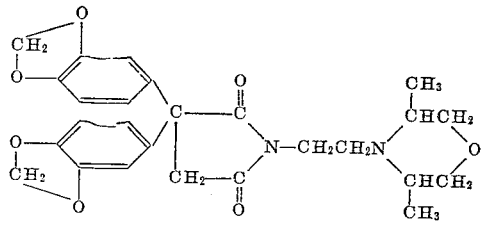

can be prepared according to the method described in Example 1, part (c), from α,α - di - (3,4 - methylenedioxyphenyl)succinimide and 2-(3,5-dimethylmorpholino)ethyl chloride.

I claim:

1. A tertiary-aminoalkyl-α,α-diarylsuccinimide having the formula

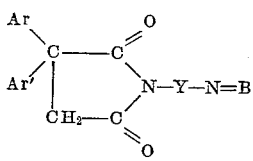

wherein Y is a lower-alkylene radical in which the free valences are on different carbon atoms, N=B is a member of the group consisting of di-lower-alkylamino, piperidino, pyrrolidino, morpholino, and lower-alkylated derivatives thereof, and Ar and Ar' are monocyclic aryl radicals of the benzene series, selected from the group consisting of the phenyl group and phenyl groups substituted by from 1 to 3 substituents selected from lower-alkyl, lower-alkoxy, nitro and halogen, which together with the α-carbon atom of the succinimide ring can form a 9-fluorenyl group.

2. A tertiary-aminoalkyl-α,α-diarylsuccinimide having the formula

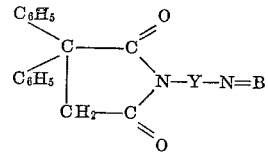

wherein Y is a lower-alkylene radical in which the free valences are on different carbon atoms, and N=B is a di-lower-alkylamino radical.

3. N-(2-dimethylaminoethyl)-α,α-diphenylsuccinimide.
4. N-(2-dibutylaminoethyl)-α,α-diphenylsuccinimide.
5. N-(2-piperidinoethyl)-α,α-diphenylsuccinimide.
6. N-(2-diethylaminoethyl)-α,α-diphenylsuccinimide.
7. N - (2 - diisopropylaminoethyl) - α,α - diphenylsuccinimide.

8. The process for preparing a tertiary-aminoalkyl-α,α-diarylsuccinimide having the formula

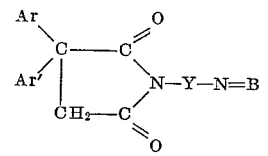

wherein Y is a lower-alkylene radical in which the free valences are on different carbon atoms, N=B is a member of the group consisting of di-lower-alkylamino, piperidino, pyrrolidino, morpholino, and lower-alkylated derivatives thereof, and Ar and Ar' are monocyclic aryl radicals of the benzene series, selected from the group consisting of the phenyl group and phenyl groups substituted by from 1 to 3 substituents selected from lower-alkyl, lower-alkoxy, nitro and halogen, which together with the α-carbon atom of the succinimide ring can form a 9-fluorenyl group, which comprises reacting an alkali metal derivative of an α,α-diarylsuccinimide having the formula

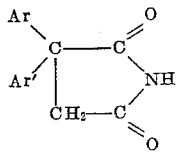

with a tertiary-aminoalkyl halide having the formula halogen—Y—N=B in an anhydrous medium.

9. The process for preparing a tertiary-aminoalkyl-α,α-diarylsuccinimide having the formula

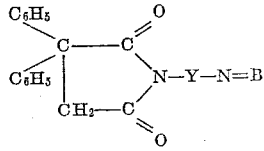

wherein Y is a lower-alkylene radical in which the free valences are on different carbon atoms, and N=B is a di-lower-alkylamino radical, which comprises reacting an alkali metal derivative of α,α-diphenylsuccinimide with a tertiary-aminoalkyl halide having the formula halogen—Y—N=B in an anhydrous medium.

10. The process for preparing N-(2-dimethylaminoethyl)-α,α-diphenylsuccinimide, which comprises reacting the sodio derivative of α,α-diphenylsuccinimide with 2-dimethylaminoethyl chloride in an anhydrous medium.

11. The process for preparing N-(2-dibutylaminoethyl)-α,α-diphenylsuccinimide, which comprises reacting the sodio derivative of α,α-diphenylsuccinimide with 2-dibutylaminoethyl chloride in an anhydrous medium.

12. The process for preparing N-(2-piperidinoethyl)-α,α-diphenylsuccinimide, which comprises reacting the sodio derivative of α,α-diphenylsuccinimide with 2-piperidinoethyl chloride in an anhydrous medium.

13. The process for preparing N-(2-diethylaminoethyl)-α,α-diphenylsuccinimide, which comprises reacting the sodio derivative of α,α-diphenylsuccinimide with 2-diethylaminoethyl chloride in an anhydrous medium.

14. The process for preparing N-(2-diisopropylaminoethyl)-α,α-diphenylsuccinimide, which comprises reacting the sodio derivative of α,α-diphenylsuccinimide with 2-diisopropylaminoethyl chloride in an anhydrous medium.

References Cited in the file of this patent

UNITED STATES PATENTS

| | | |
|---|---|---|
| 2,271,122 | Harman | Jan. 27, 1942 |
| 2,555,353 | Lucas et al. | June 5, 1951 |
| 2,666,060 | Sury | Jan. 12, 1954 |